United States Patent
Richardson et al.

(10) Patent No.: US 11,157,504 B2
(45) Date of Patent: *Oct. 26, 2021

(54) DOCUMENT REVIEW MANAGEMENT SYSTEM

(71) Applicant: Chegg, Inc., Santa Clara, CA (US)

(72) Inventors: Joshua John Richardson, Cupertino, CA (US); Vincent Le Chevalier, San Jose, CA (US); Kostiantyn Havriuk, Khmelnytsky (UA); Semenov Vasil Alexandrovich, Kiev (UA)

(73) Assignee: Chegg, Inc., Santa Clara, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/867,450

(22) Filed: May 5, 2020

(65) Prior Publication Data

US 2020/0265056 A1    Aug. 20, 2020

Related U.S. Application Data

(63) Continuation of application No. 16/293,452, filed on Mar. 5, 2019, now Pat. No. 10,650,010, which is a
(Continued)

(51) Int. Cl.
*G06F 16/2457* (2019.01)
*G06Q 10/06* (2012.01)
(Continued)

(52) U.S. Cl.
CPC ........ *G06F 16/24578* (2019.01); *G06F 16/93* (2019.01); *G06F 40/169* (2020.01); *G06Q 10/06395* (2013.01); *G06Q 10/06398* (2013.01)

(58) Field of Classification Search
None
See application file for complete search history.

(56) References Cited

U.S. PATENT DOCUMENTS

| 2004/0085354 A1* | 5/2004 | Massand | G06F 40/197 715/751 |
| 2011/0173191 A1* | 7/2011 | Tsaparas | G06Q 30/02 707/723 |

(Continued)

OTHER PUBLICATIONS

Ausloos et al., "Quantifying the quality of peer reviewers through Zipf's law", Scientometrics, Sep. 5, 2015, 22pg. (Year: 2015).*
(Continued)

*Primary Examiner* — Ryan D. Coyer
(74) *Attorney, Agent, or Firm* — Kavita Aggarwal

(57) ABSTRACT

An online review system determines scores for document authors and document reviewers. An author score is based on a number of comments added to a document by reviewers. One way to compute the author score is to use a ratio of a number of comments provided by reviewers of a document to a number of lines of document contents provided by the author. A reviewer score for a reviewer is based on an amount of comments subsequently made by other reviewers, and on the document content itself, such as a ratio of a number of comments provided in subsequent reviews of a document to a number of lines of original document contents. In some embodiments, the online review system monitors trends in scores of individuals or teams.

10 Claims, 5 Drawing Sheets

Related U.S. Application Data continuation of application No. 15/449,785, filed on Mar. 3, 2017, now Pat. No. 10,261,953.

(51) Int. Cl.
*G06F 16/93* (2019.01)
*G06F 40/169* (2020.01)

(56) References Cited

U.S. PATENT DOCUMENTS

| | | | | |
|---|---|---|---|---|
| 2014/0188897 A1* | 7/2014 | Baker | ............... | G06F 16/24578 707/748 |
| 2015/0178279 A1* | 6/2015 | Chen | .................. | G06F 16/9535 707/748 |
| 2017/0236086 A1* | 8/2017 | Simon | .............. | G06Q 10/06375 705/7.37 |

OTHER PUBLICATIONS

Casnici et al., "Attitudes of Referees in a Multidisciplinary Journal: An Empirical Analysis", Wiley Periodicals, Apr. 15, 2016, 9pg. (Year: 2016).*

Wijesinha-Bettoni et al., "Reviewing the review process: New Frontiers of Peer Review", Xjenza Online, 2016, 4pg. (Year: 2016).*

\* cited by examiner

DOCUMENT REVIEW MANAGEMENT SYSTEM

CROSS REFERENCE TO RELATED APPLICATIONS

This application is a continuation of application Ser. No. 16/293,452, which is a continuation of application Ser. No. 15/449,785, both of which are incorporated by reference herein.

FIELD OF ART

This disclosure relates generally to content review systems, and in particular to scoring content and content reviews.

BACKGROUND

Written content, such as code for software programs and other written documents, often benefits from peer review. Software development, one example of content creation, may be overseen by managers such as project leads who spend many working hours reviewing code produced by their developers and appraising peer reviews provided by other developers, such as team members. Complex software projects can involve many developers in many locations, and reviewing code and code reviews in such a situation can be time-consuming and complicated for intermediate reviewers and project leads. A complicated reviewing process may result in a loss of productivity and poor content quality due to a possible lack of valuable peer and manager feedback and due to having no way of monitoring changes in quality of content and content reviews over time.

SUMMARY

An online system collects content (e.g., as contained in documents) from authors and collects content reviews from participating reviewers. Authors upload their documents to the online system and receive feedback, reviews, ratings, or other recommendations from reviewers. Some examples of reviewers who may review a document include peer reviewers, managers, people managers, project managers, quality-assurance agents, quality assurance engineers, publication editors, technical leads, subject-matter experts, educators, an author providing a self-review, artificial intelligence agents, and members of the public. In some embodiments, reviewers provide feedback for a document by adding comments inline in the document. Comments may include suggestions for improvements, citations of logical errors, and ideas for stylistic changes, for example. In some embodiments, reviewers can also include positive feedback. In some embodiments, a set of predefined rules may be used to include metadata indicating why a reviewer included a comment in a document. Such rules may be associated with weighting values, such that a score based on a number of comments received may be influenced by the specific comment types.

The online system receives document reviews from one or more reviewers. In one embodiment, the online system manages the reviewing process by requesting a review from a reviewer when a new review is needed. In some embodiments, a review comprises one or more comments added to a document by a reviewer. In some embodiments, a review may additionally include zero comments added to a document by a reviewer, as when the reviewer views the document but decides that the document does not need any commentary. In some embodiments, the online system determines scores for authors. Such author scores are based on a relationship between the number of comments provided by reviewers and the number of lines of content under review in the document, such as a ratio thereof. The online system may also determine scores for reviewers. In some embodiments, a reviewer score is based on a relationship between a number of comments provided by subsequent reviewers and a number of lines of content under review (e.g., a ratio). In some embodiments, scores account for rules that have been associated with specific comments by incorporating weights that were assigned to the rules in the score calculations.

The online system provides the determined author scores and reviewer scores for evaluation by participants, managers, and other related parties. In some embodiments, the online system additionally monitors trends of the scores over time, sorts scores by teams, generates reports about user scores, and/or identifies score anomalies.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Embodiments described herein provide for collection and analysis of documents and reviews of document contents in an online review system. In one embodiment, the online review system analyzes reviewed documents to determine scores for authors and reviewers who provided feedback about the content. The online review system may further use the scores to monitor trends related to the quality and efficiency of work done by authors and reviewers. The systems and methods described herein provide a tool for authors, reviewers, and managers to keep track of team performance.

Figure 1:
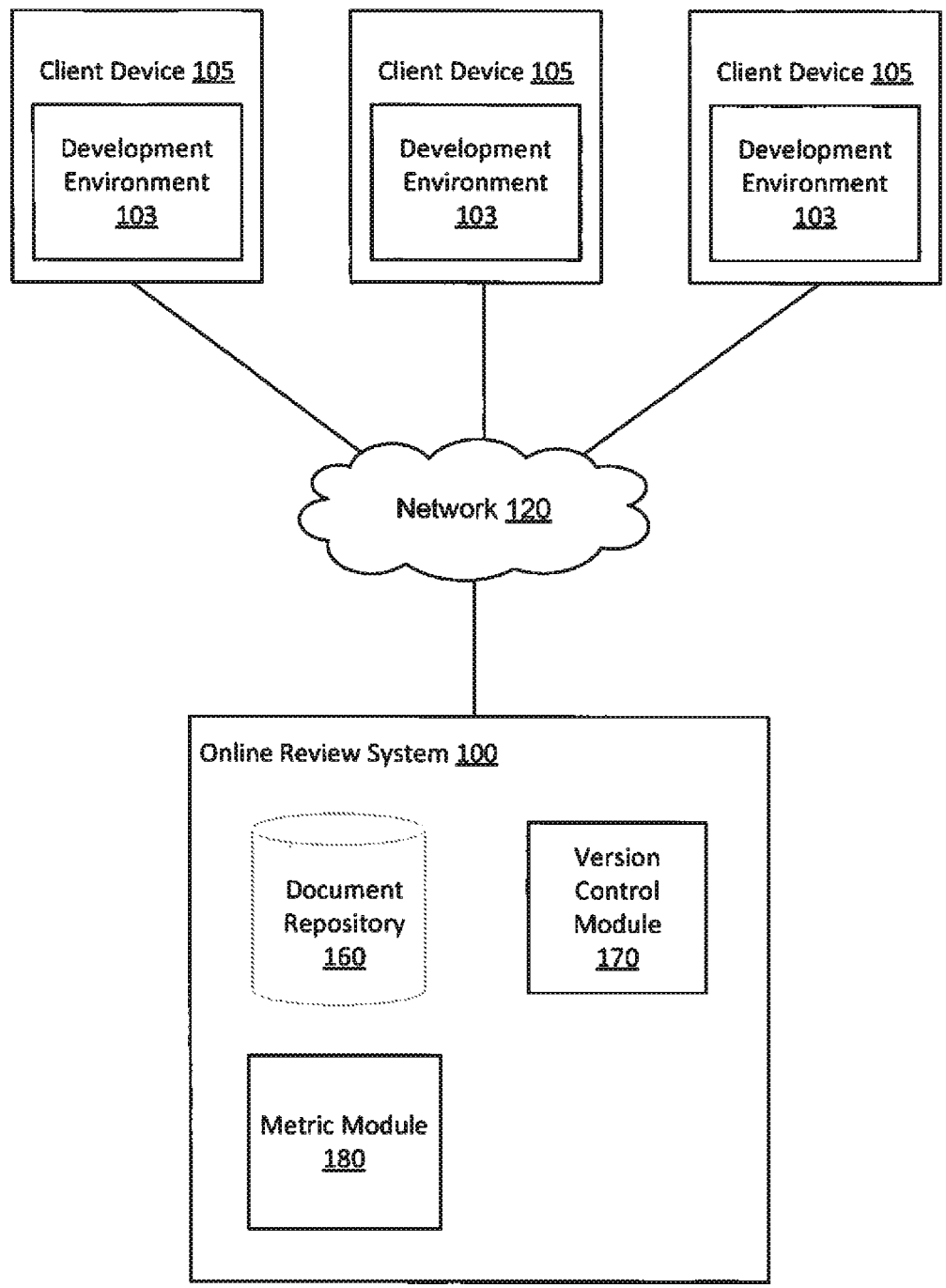
FIG. 1 is a high level block diagram that illustrates an environment of an online review system, in accordance with an embodiment.

FIG. 1 is a high level block diagram that illustrates an environment of an online review system 100, in accordance with an embodiment. The system environment shown in FIG. 1 includes one or more client devices 105, a network 120, and an online review system 100. In some embodiments, a client device 105 may include a development environment 103. The online review system comprises a metric module 180, a version control module 170, and a document repository 160.

A client device 105 is a computing device capable of receiving user input and transmitting and/or receiving data via the network 120. In one embodiment, a client device 105 is a conventional computer system, such as a desktop or a laptop computer. Alternatively, a client device 105 may be a device having computer functionality, such as a personal digital assistant (PDA), a mobile telephone, a smartphone, or another suitable device. A client device 105 is configured to communicate via the network 120. In one embodiment, a client device 105 executes an application allowing a user of the client device 105 to interact with the online review system 100. For example, a client device 105 executes a browser application to enable interaction between the client device 105 and the online system 100 via the network 120. In another embodiment, a client device 105 interacts with the online system 100 through an application programming interface (API) running on a native operating system of the client device 105, such as IOS® or ANDROID™.

The client devices 105 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

In some embodiments, a client device 105 includes a development environment 103. A development environment 103 is a software application, e.g., with text editing capabilities, through which a user can develop content such as code. The development environment 103 may facilitate content reviews by including reviewing functionality for displaying and adding document reviews from within the environment. In some embodiments, the development environment 103 may also provide functionality for transmitting content from client device 105 to online review system 100 (e.g., integrated document uploading functionality).

In some embodiments, the development environment 103 is an integrated development environment (IDE). An IDE is a software program that provides a software developer with a wide variety of tools that aid in the process of software development. These tools provide functionality for one or more of editing, compiling, linking, executing, testing, debugging, and profiling source code.

The online review system 100 receives content (i.e., code, written documents, etc.) from authors who submit the content from a client device 105 over the network 120. The online review system 100 facilitates one or more reviews of the content by providing the content to reviewers. Reviewers may include peers, managers, instructors, or other users who read the content and provide feedback. In one embodiment, the author may provide feedback on the author's own submitted work (e.g., a self-evaluation). The online review system 100 scores authors and reviewers based on subsequent reviews. The online review system uses the scores to provide data about trends for individuals and teams. For example, the online system may provide a report to a manager, indicating that a team the manager supervises has received many comments about the poor quality of their code submissions, and the manager may subsequently make adjustments to a workflow for the team when planning an upcoming project. In some embodiments, the online review system 100 stores information about which authors, peers, managers, instructors, or other users are on a team or on teams together so it can transmit information about scores and trends to relevant users.

The document repository 160 stores content from authors received at the online system. The document repository 160 may also store reviews of documents, submitted by reviewers. In some embodiments, the online review system 100 accesses documents stored elsewhere on the network 120, for example on a remote server. In one embodiment, the document repository 160 allows multiple versions of documents. In one embodiment, the document repository 160 stores only updated portions of new versions of previously submitted content.

In one embodiment, the online review system 100 includes a version control module 170. The version control module 170 determines the portions of an uploaded document that are different from previously received versions. In some embodiments, the version control module 170 notifies one or more reviewers of the document of the portions of the document that differ from the prior versions, so that the reviewers can more efficiently review and comment on new material, and collects any document reviews that the reviewers produce.

The metric module 180 determines scores for developers and reviewers based on comments received from reviewers in regards to documents they are assigned to review. The metric module 180 is discussed in more detail in a description of FIG. 3 below.

Comments are written critiques, observations, remarks, and the like, referencing part or all of a document. In some embodiments, comments are included inline in a document. Thus, a line of original document content may also be a line where a comment has been added by a reviewer. Comments may also be included on separate document lines. It may also be possible for one comment to span multiple lines of a document, as when a comment has been formatted to include newline characters (e.g., to aid readability). In some embodiments, comments may be indicated by inclusion of one or more predefined symbols. For example, in some programming languages, inline comments may be delineated by a double forward slash symbol "//" or a pound sign "#" that is used to partition a line into original document contents and a comment portion. As another example, some programming languages include symbols that represent block comments (i.e., individual comments that may span multiple lines), such as by beginning a comment with "/*" and ending a comment with "*/". In some embodiments, comments may be indicated using metadata separate from the content itself, rather than being inline, such as instances of predefined metadata flags indicating various situations (such as a flag indicating that associated code should be checked for errors, that the style of the associated code does not conform to the proper standard, or the like).

User Interfaces

Figure 2A:
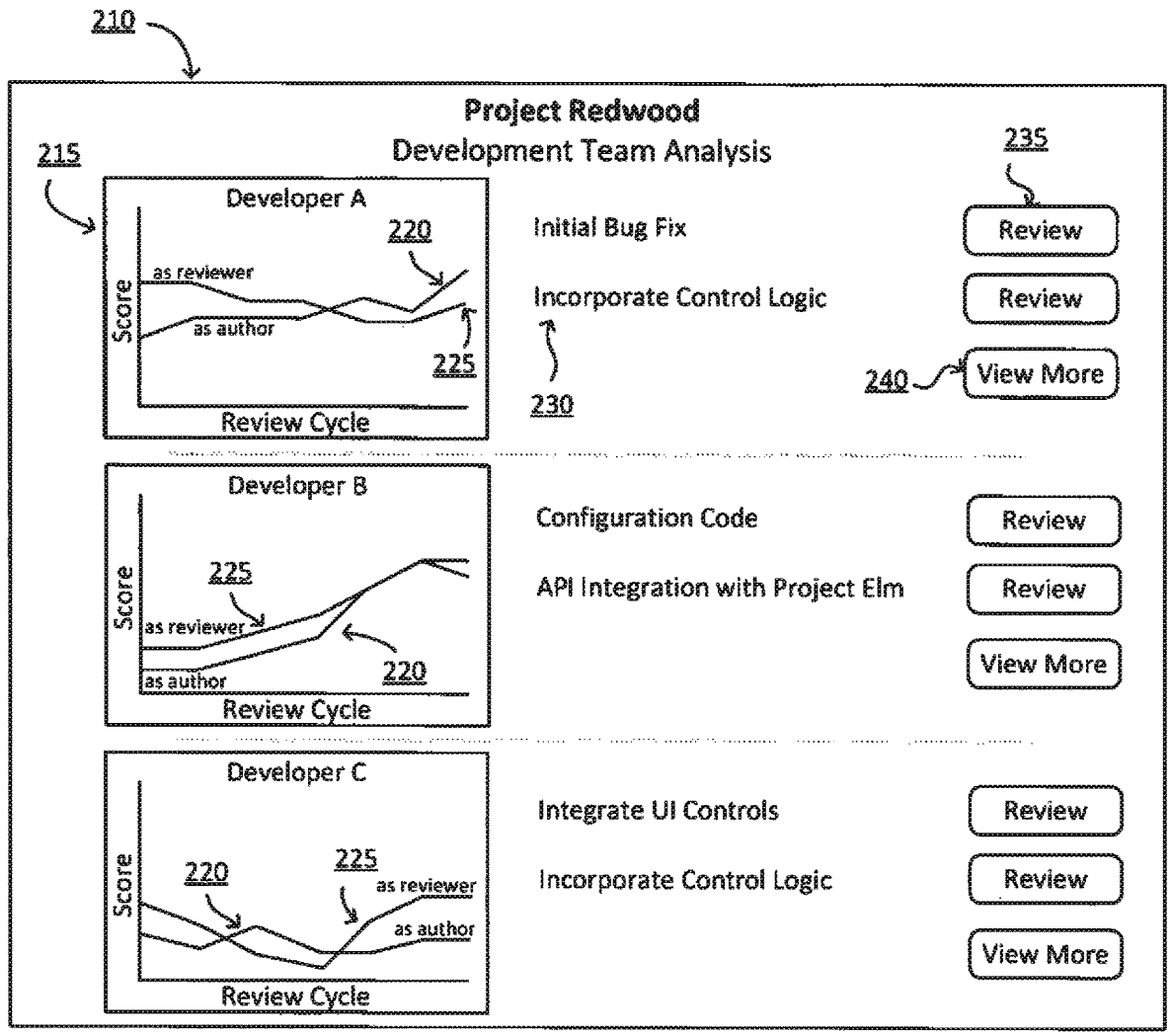
FIG. 2A illustrates an example user interface for an online review system, in accordance with an embodiment.

FIG. 2A illustrates an example user interface for an online review system, in accordance with an embodiment. In some embodiments, the online review system 100 determines scores and trends for participating authors and reviewers and presents the scores and trends via a user interface for monitoring by the authors, reviewers, and their supervisors or instructors. For example, a web page displaying trends and scores may be accessed via a web browser. Some embodiments of the online review system 100 do not include an interactive user interface. For example, an online review system 100 can alternatively provide score values and trend predictions in a raw data format (e.g., stored in plain text files) for an author, reviewer, or manager to assess.

The example of FIG. 2A depicts a user interface 210 through which a project lead may track a software development team. The user interface 210 may be presented as a web page via a web browser, or may be presented by another software application. In the embodiment shown in FIG. 2A, trends for individual software developers on a development team for a project are presented for assessment by a manager or project lead. A trend graph 215 is displayed for each developer on the team. The trend graph 215 represents the changes in scores assigned to the developer by the online review system 100 over time, for example, over the course of several review cycles for a project. A trend graph may include an author score trend 220 and a reviewer score trend 225 for the developer.

An author score trend 220 tracks the scores an author (i.e., developer, writer, composer, etc.) receives for documents the author writes. A reviewer score trend 225 tracks the scores a reviewer receives for reviewing documents submitted by participants. A participant may be both an author and a reviewer.

A user interface 210 may include listings 230 of content a participant is involved with either as an author or as a reviewer. In some embodiments, the user interface 210 includes an overview pane that allows reviewers and/or supervisors to view a report that includes data about author and reviewer scores for team members associated with a project. Note that team members may include any individuals who participate in the authorial process or review process and/or have been granted access to view the data about author and reviewer scores. In some cases, the user interface 210 includes functionality for reviewers to add comments and feedback to submitted documents via the user interface. For example, a user may be able to access content to provide comments using software interface elements 235 that open a document for review and may use additional software elements 240 to display further documents associated with a participant.

Figure 2B:
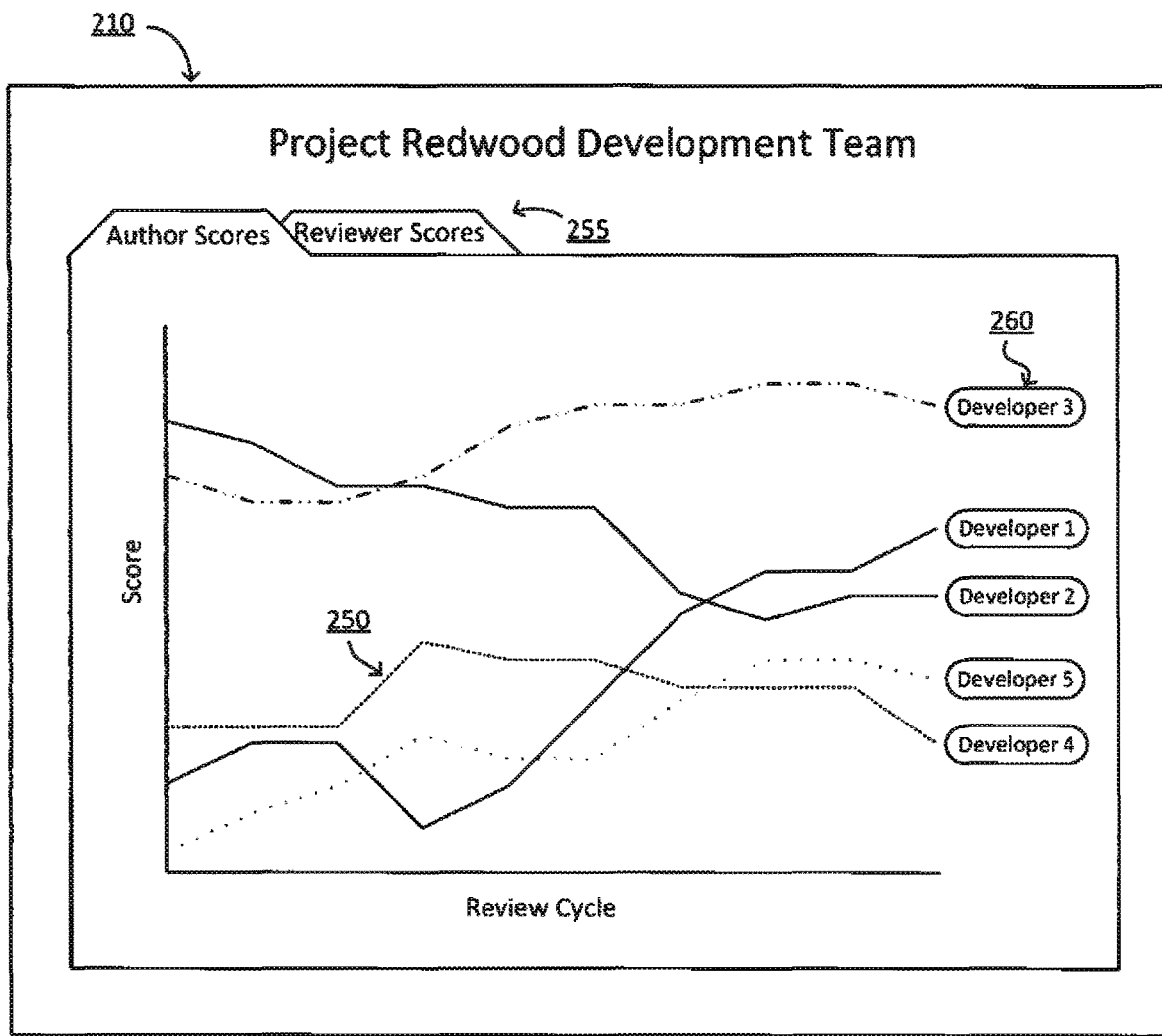
FIG. 2B illustrates a second example user interface for an online review system, in accordance with an embodiment.

FIG. 2B illustrates another example user interface for an online reviewing system, in accordance with an embodiment. In the example of FIG. 2B, a user interface 210 displays a graph with overlays of author score trend lines of participants. Such a graph makes it easy to compare scores and/or improvements made by multiple participants, such as determining that Developer 1, though initially receiving lower author scores than Developer 2, has improved over time and now receives author scores more favorable than those of Developer 2. An overlay graph may include trend lines 250 and trend identifiers 260 that indicate which trend line 250 pertains to a particular participant. The interface 210 may include interactive software elements 255 that allow a user to switch between various trend comparisons. For example, a user may be able to switch between viewing a graph of trend lines 250 related to author scores and viewing a graph of trend lines 250 related to reviewer scores, such as by selecting tabs 255.

Metric Module

Figure 3:
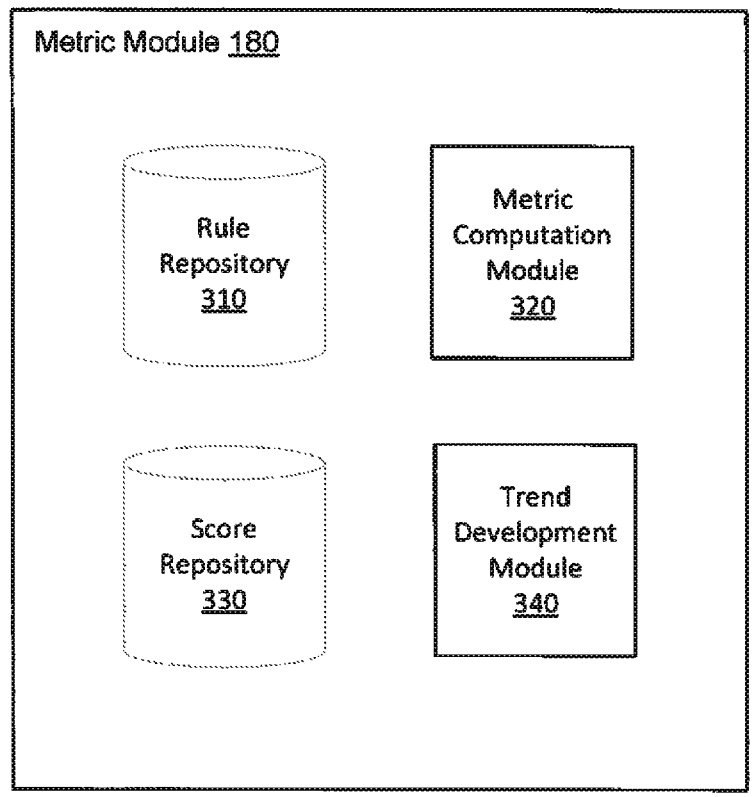
FIG. 3 is a high level block diagram that illustrates a system architecture for a metric module, in accordance with an embodiment.

FIG. 3 is a high level block diagram that illustrates a system architecture for a metric module 180, in accordance with an embodiment. The metric module 180 determines scores to assign to authors and reviewers. Scores are based on the content of documents (e.g., as stored in the document repository 160), such as a number of lines of original document contents and a number of comments provided by reviewers. The metric module includes a rule repository 310, a metric computation module 320, a score repository 330, and a trend development module 340.

The rule repository 310 stores rules that can help reviewers to provide categorized feedback when commenting on a document. A rule is a high level policy that defines quality. The use of a rule in conjunction with a comment indicates that the comment relates to a concept or policy that is defined by the rule. In some embodiments, multiple rules may be assigned to one comment. Assigning a rule to a comment is also herein referred to as tagging a comment. Tagging a comment may comprise including keywords related to specific rules in comment text, including special characters associated with a rule in a comment, including a link to metadata associated with a rule in the comment, and so forth. In some embodiments, a reviewer is not required to assign a rule to each comment provided as review. In some embodiments, no rules are defined for reviewers to associate with document comments. A participant, such as a manager or instructor, may specify a set of rules, for example, to apply to an upcoming code review for a development team. Rules may be subsequently added or edited. When a reviewer provides a review of a document (e.g., as inline comments), the reviewer can specify one or more rules that the reviewer considers relevant to the particular situation or that is the reviewer's reason for including the feedback. For example, a manager may define a "Don't Repeat Yourself" rule that reviewers can associate with comments in which they point out that the author has repeated a logical process that ought to be written as a single separate function.

In one embodiment, rules stored in the rule repository 310 include weighting values that indicate how a comment tagged with such a rule should be accounted for in a scoring process. As one example, a manager may assign smaller weighting values to rules associated with minor errors (e.g., stylistic inconsistencies) and may assign larger weighting values to rules associated with major errors (e.g., logical errors). As another example, a manager wishing to reward documents and reviews that receive positive feedback may include a "Positive Feedback" rule that includes a negative weighting value, or a weighting value of zero, so that positive comments either boost a resulting score (lower scores being indicative of superior performance) or are not counted against a final score of the author or reviewers. In cases where multiple rules may be assigned to a comment, the scoring process may account for the multiple rules in a variety of ways. For example, a weighting value of each rule may be used to calculate a score, the weight of only a first tagged rule may be used to calculate a score, a largest or smallest rule weight may be used to calculate a score, etc.

The metric computation module 320 calculates scores for authors and reviewers of documents stored in the document repository 160. An author's score in relation to a document is based on some or all reviews provided for the document (i.e., as comments written by reviewers). A reviewer's score in relation to a document is based on some or all reviews provided for the document after the reviewer added feedback to the document. That is, a reviewer's score is based on subsequent reviews to the document.

An author score is calculated for some or all authors who transmit documents to the online review system 100. The author score is based on a comparison of the amount of commenting (e.g., number of comments) with the amount of document content (e.g., number of lines of original document content). In one embodiment, for example, the metric computation module counts a number of comments that have been included in a document by reviewers and compares the amount to a number of lines of original document content submitted by the author. That is, a metric for scoring an author with respect to a document is the number of comments on a document divided by the number of lines of original content (i.e., not reviewer comments) in the document. In embodiments that include functionality for tagging comments according to rules with associated weighting values, the metric for scoring an author with respect to a document is the sum of the products of the number of each type of comment (i.e., as categorized by rules) and the weighting value associated with that type of comment, divided by the number of lines of original document content submitted by the author. In some embodiments, a different unit value may be used to reference the number of lines of content in a document; for example, the scoring metric might alternatively be the number of comments received on a document per every 100 lines of content in the document.

A reviewer score is calculated for some or all reviewers who review documents that have been submitted to the online review system 100 by commenting on the document contents. A reviewer score is based on comments added to the document by other reviewers after the addition of the comments of the reviewer being scored. In one embodiment, the metric computation module counts a number of comments that have been included in a document by subsequent reviewers and compares it to a number of lines of original document content submitted by the author. That is, a metric for scoring a reviewer with respect to a document is the number of comments received on a document subsequent to the reviewer's review divided by the number of lines of content in the original document. For example, a document might have 25 lines of original content created by an author, 8 of comments provided by a first reviewer, and 4 comments provided by a second reviewer. A resulting reviewer score for the first reviewer would be 4 divided by 25, or 0.16.

In some embodiments that include functionality for tagging comments according to rules with associated weighting values, the metric for scoring a reviewer with respect to a document is the sum of the products of the number of each type of subsequent comment (i.e., as categorized by rules) and the weighting value associated with that type of comment, divided by the number of lines of original document content submitted by the author. As with schemes for scoring authors, in some embodiments, the weights associated with scores may be positive or negative. In addition to basing weights on rule type, weights may also be based on other indicators, such as the role or importance of the reviewer, the reviewer scores of other reviewers, and the role or importance of other reviewers. For example, a subsequent review by a reviewer in a managerial role might be weighted more heavily than a subsequent review by a peer reviewer.

In most situations, each subsequent reviewer for a document will provide fewer comments than previous reviewers, given that in most cases the earliest reviewers will catch the most egregious errors (e.g., logical errors in code, or typos in a written document). Thus, an implication of a subsequent reviewer including many comments may be that an earlier reviewer did not do a thorough job at reviewing the document.

Managers, project leads, and instructors may also provide feedback on documents. In some cases, reviewers, such as managers, project leads, instructors, or experts, may provide cross-project feedback (i.e., reviewing a document from a project they are not directly affiliated with). In some embodiments, a manager not affiliated with a project may receive a reviewer score based on a comparison of the number of comments the unaffiliated manager provides on a project document and the number of comments an affiliated manager provides on the project document.

In some embodiments, a reviewer score previously assigned to a reviewer may influence the extent to which the reviewer's comments are incorporated into reviewer or author scores, e.g., by being applied as a weight for the rating of the reviewer. For example, if a reviewer has received low reviewer scores in the past, the reviewer's comments on a document may not influence author scores or reviewer scores as much as comments from a different, more highly rated reviewer.

In some embodiments, the metric module 180 may include an additional module that can automatically evaluate content appropriateness and relevance. For example the metric module 180 may use preprogrammed rules and/or trained machine models to analyze comments and detect whether the comments include content that may be considered sexist, racist, ageist, unrelated to the document contents (e.g., jokes, comments about the weather), and so forth. In such cases, the metric module 180 may assign a weighting factor to a comment or ignore the comment so that it is not included in calculated author and reviewer scores. In some embodiments, the metric module 180 may flag such comments for review by a manager (e.g., by adding specific symbols, or by associating the comment with a metadata tag).

According to one evaluation scheme in which no weighting rules are used, a zero represents a perfect score (e.g., there was no reason for any reviewers to provide feedback or suggestions for improving the document) and scores nearer to one indicate a document or a document review that received a relatively large amount of feedback, and which is therefore likely in need of improvement. Other evaluation schemes, such as those that allow for negative or positive weights (e.g., corresponding respectively to positive feedback and critical errors), may also be used, and may have a variety of highest and lowest possible scores.

The score repository 330 stores author scores and reviewer scores computed by the metric computation module 320. The score repository 330 may store scores in association with information about the documents and/or projects they relate to. Historical scores in the score repository 330 may be used to compute trends for individual users or teams. Trends may be computed over individual projects or over multiple projects.

The trend development module 340 compiles score information from the score repository 330 to track changes in scores received by authors and reviewers over time. A trend is a dynamic indicator of an author's code quality and of reviews provided by peers. Trend data may be displayed as a graph in a user interface, as depicted in FIG. 2A and FIG. 2B.

Process Flow

Figure 4:
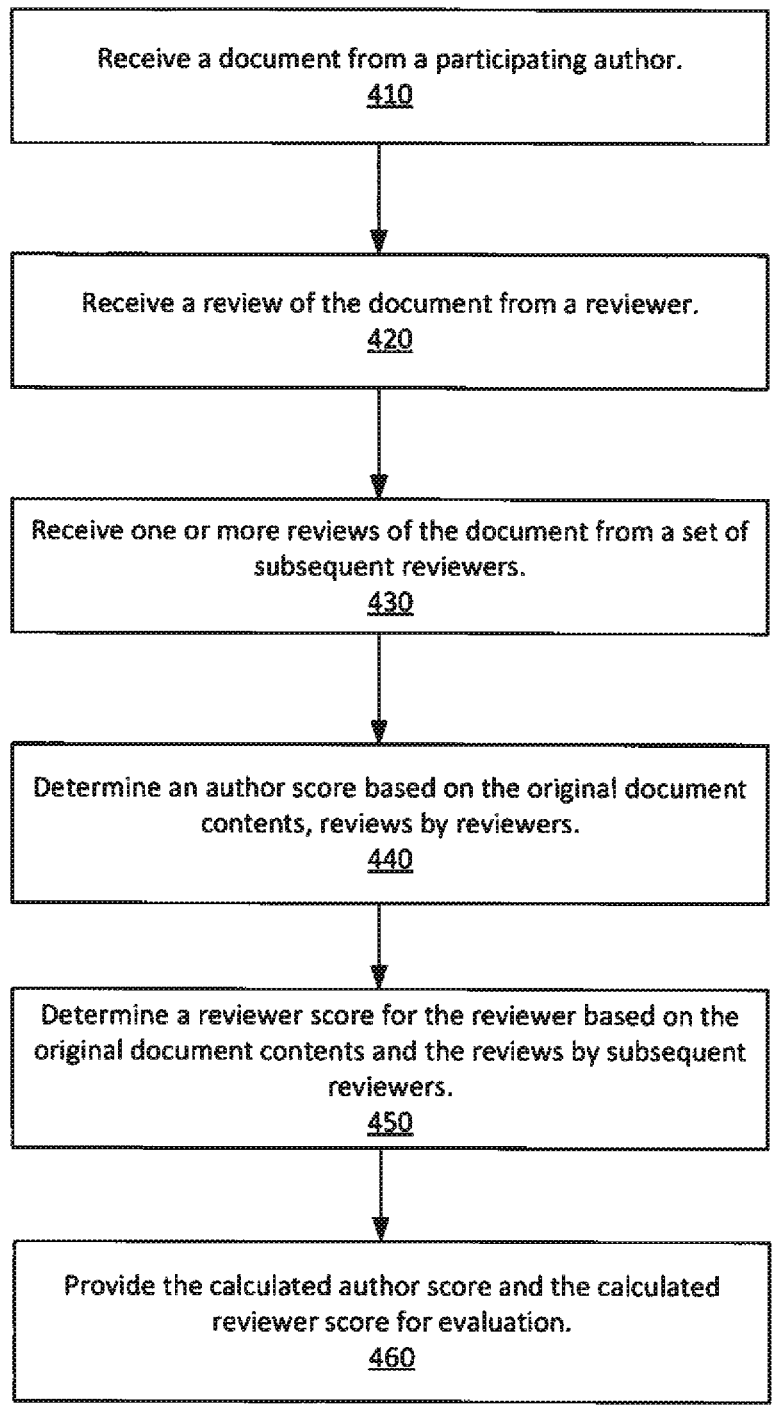
FIG. 4 is a flowchart that illustrates an overall process for scoring content and content reviews, in accordance with an embodiment.

FIG. 4 is a flowchart depicting a process for scoring authors and reviewers, in accordance with an embodiment. The online review system 100 receives 410 a document from a participating author. A document may be a written work, such as an essay or a coded software program. The document is stored in a document repository 160. In some embodiments, a version control module 170 determines whether the document has been previously stored by the document repository 160 and, if so, what portions of the document have been changed.

The document is transmitted to a reviewer for review (e.g., via email). The reviewer need not be an initial reviewer of the document, which in some cases may have received reviews from other reviewers prior to the review by the reviewer described here. In some embodiments, only a portion of the document that includes changed content (i.e., as detected by the version control module 170) is sent to the reviewer for review. The reviewer adds comments to the document. In cases in which the reviewer is not an initial reviewer of the document, the reviewer may provide comments about portions of the document that have not been commented on by previous reviewers and may add additional commentary to clarify or rebut comments from previous reviewers. In some embodiments, the reviewer includes information indicating that particular comments apply to certain rules, such as may have been predefined by a manager or instructor. For example, the reviewer may add a metadata tag to each comment, associating the comment with a specific rule. The online review system receives 420 a review of the document from the reviewer. In one embodiment, receiving 420 the review comprises receiving the entire document, with the review itself being included inline (e.g., as comments) in the document.

In some embodiments, the document and accompanying comments from the reviewer are transmitted to a set of one or more subsequent reviewers for additional review. In some embodiments, the document transmitted to the set of subsequent reviewers may only be the changed portion of the document, such as the same portion that was provided to the reviewer. The reviewers in the set of subsequent reviewers add comments to the document, and may include information indicating that particular comments apply to certain rules, as was done by the reviewer. In some embodiments, the reviewers in the set of subsequent reviewers receive and review the document in sequence (i.e., rather than all at once) such that each reviewer reviews a document that includes comments from additional previous reviewers. The online review system 100 receives 430 reviews of the document from the subsequent reviewers.

The online review system 100 determines 440 an author score based on the original document contents and the comments provided by one or more reviewers of the document (e.g., comments provided by the reviewer and comments provided by the set of subsequent reviewers). In one embodiment, the metric module 180 computes an author score by determining a ratio between the number of comments that reviewers added to the document, and the number of lines of content in the original document. In some embodiments, rules associated with comments provide weight values indicating to what extent certain comments should be included in a count of the number of comments provided for a document.

The online system determines 450 a reviewer score for the reviewer based on the original document contents, and the comments provided by the reviewers in the set of subsequent reviewers. In some embodiments, the metric module 180 computes a reviewer score by determining a ratio between the number of lines of comments that reviewers in the set of subsequent reviewers added to the document, and the number of lines in the original document. In some embodiments, rules associated with comments provide weight values indicating to what extent certain lines of comments should be included in a count of the number of lines of comments provided for a document. Subsequent reviewers (who are not the final reviewer) may also receive a reviewer score (e.g., based on reviews added to the document after a subsequent reviewer submits a review). In some embodiments, scores for an author and some or all reviewers may be calculated after a final reviewer (such as a manager) completes a review of a document. In some embodiments, scores for authors and/or reviewers are calculated (or recalculated) at predetermined intervals, or each time additional comments are added to the document.

The online review system 100 provides 460 the determined author score and the determined reviewer score (as well as calculated scores of any other reviewers) for evaluation by the author and reviewers. In some embodiments, the online review system 100 provides the determined scores for evaluation by people other than the author or reviewers. For example, the online review system 100 may provide the scores to managers, project leads, or instructors. In some embodiments, a trend development module 340 compiles scores of individuals or project teams to display trends in the scores. For example, a manager may want to monitor downward, stable, or upward trends in scores to make more informed decisions regarding project timelines, project milestones, overall content quality, and expected delays. The online review system 100 may generate reports about user scores and/or identify score anomalies. For example, the online system 100 may compare an author's most current score with the author's previous scores and send a message to a supervisor of the author if the author score changed by more than a predetermined value from past scores received by the author.

Additional Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method comprising:
at an online system:
receiving a document created by an author;
receiving a first review of the document from a first reviewer, the first review including one or more comments provided by the first reviewer;
receiving one or more second reviews from a set of second reviewers, the second reviews including one or more comments provided by reviewers in the set of second reviewers;
storing the document, the first review, and the one or more second reviews in a document repository associated with the online system;
determining a reviewer score for the first reviewer based on the document and the one or more second reviews;
determining an author score for the author based on the document, the first review, and the one or more second reviews, wherein determining the author score comprises:
calculating a weighted sum of a number of comments in the first review and the one or more second reviews, the weighted sum including a sum of products, a product comprising a number of comments associated with a rule and a weighting value corresponding to the rule, and
computing the author score based on a ratio between the weighted sum and a number of lines of the document;
storing the reviewer score and the author score in a score repository associated with the online system;
providing the reviewer score for evaluation by team members of the first reviewer; and
providing the author score for evaluation by team members of the author.

2. The computer-implemented method of claim 1, wherein determining a reviewer score for the first reviewer comprises:
computing the reviewer score for the first reviewer based on a comparison of the number of lines of the document and a number of comments in the one or more second reviews.

3. The computer-implemented method of claim 1, wherein one or more comments provided by one or more reviewers are tagged with rules, a rule indicating a categorization of the comment with which the rule is associated and associating a weighting value with the comment with which the rule is associated.

4. The computer-implemented method of claim 1, wherein determining a reviewer score for the first reviewer comprises:
calculating a weighted sum of a number of comments added to the document by the one or more reviewers in the set of second reviewers, the weighted sum including a sum of products, a product comprising a number of comments associated with a rule and a weighting value corresponding to the rule; and
computing the reviewer score based on a ratio between the weighted sum, and the number of lines of the document.

5. The computer-implemented method of claim 1, further comprising monitoring trends in author scores and reviewer scores over time, and providing information concerning the trends to the team members of the author and the team members of the first reviewer.

6. A non-transitory computer-readable storage medium storing computer program instructions executable by one or more processors of a system to perform steps comprising:
receiving a document created by an author;
receiving a first review of the document from a first reviewer, the first review including one or more comments provided by the first reviewer;
receiving one or more second reviews from a set of second reviewers, the second reviews including one or more comments provided by reviewers in the set of second reviewers;
storing the document, the first review, and the one or more second reviews in a document repository;
determining a reviewer score for the first reviewer based on the document and the one or more second reviews;

determining an author score for the author based on the document, the review, and the one or more second reviews, wherein determining the author score comprises:
  calculating a weighted sum of a number of comments in the first review and the one or more second reviews, the weighted sum including a sum of products, a product comprising a number of comments associated with a rule and a weighting value corresponding to the rule, and
  computing the author score based on a ratio between the weighted sum and a number of lines of the document;
storing the reviewer score and the author score in a score repository;
providing the reviewer score for evaluation by team members of the first reviewer; and
providing the author score for evaluation by team members of the author.

7. The non-transitory computer-readable storage medium of claim 6, wherein determining a reviewer score for the first reviewer comprises:
  computing the reviewer score for the first reviewer based on a comparison of the number of lines of the document, and the number of comments received in the one or more reviewers second reviews.

8. The non-transitory computer-readable storage medium of claim 6, wherein one or more comments provided by one or more reviewers are tagged with rules, a rule indicating a categorization of the comment with which the rule is associated and associating a weighting value with the comment with which the rule is associated.

9. The non-transitory computer-readable storage medium of claim 6, wherein determining a reviewer score for the first reviewer comprises:
  calculating a weighted sum of a number of comments in the one more second reviews, the weighted sum including a sum of products, a product comprising a number of comments associated with a rule and a weighting value corresponding to the rule; and
  computing the reviewer score based on a ratio between the weighted sum, and the number of lines of the document.

10. The non-transitory computer-readable storage medium of claim 6, further storing computer program instructions to perform monitoring trends in author scores and reviewer scores over time, and providing information concerning the trends to the team members of the author and the team members of the first reviewer.

* * * * *